US005347090A

United States Patent [19]

Cerda

[11] Patent Number: 5,347,090

[45] Date of Patent: Sep. 13, 1994

[54] METHOD FOR CONNECTING THE SCREEN OF AT LEAST ONE SCREENED ELECTRICAL CABLE TO AN ELECTRICAL LINK WIRE, AND CONNECTION OBTAINED BY IMPLEMENTATION OF THIS METHOD

[75] Inventor: Léon G. Cerda, Carry-le-Rouet, France

[73] Assignee: Societe Anonyme dite: Aerospatiale Societe Nationale Industrielle, Paris, France

[21] Appl. No.: 968,187

[22] Filed: Oct. 29, 1992

[30] Foreign Application Priority Data

Nov. 12, 1991 [FR] France ................................ 91 13862

[51] Int. Cl.$^5$ .............................................. B32B 31/06

[52] U.S. Cl. .................................... 174/84 R; 156/49; 156/85; 156/86; 156/296; 174/88 C; 174/DIG. 8

[58] Field of Search ........................ 156/48, 49, 85, 86, 156/296; 174/71 C, 72 R, 84 R, 88 C, 106 R, 107, 117 A, DIG. 8

[56] References Cited

U.S. PATENT DOCUMENTS

| | | | |
|---|---|---|---|
| 2,730,473 | 1/1956 | Batezell et al. | 156/49 |
| 2,929,862 | 3/1960 | Aune et al. | 174/88 C |
| 3,525,799 | 8/1970 | Ellis | 174/84 R |
| 3,787,607 | 1/1974 | Schlafly | 156/49 |
| 4,264,384 | 4/1981 | Karanastassis | 156/49 |
| 4,271,330 | 6/1981 | Watine et al. | 174/84 R |
| 4,384,404 | 5/1983 | Watine | 174/84 R |
| 4,521,642 | 6/1985 | Vives | 156/49 |
| 5,006,286 | 4/1991 | Dery et al. | 264/40.2 |
| 5,143,761 | 9/1992 | Chiotis et al. | 174/84 R |
| 5,194,692 | 3/1993 | Gallusser et al. | 156/48 |

FOREIGN PATENT DOCUMENTS

| | | |
|---|---|---|
| 0402046 | 12/1990 | European Pat. Off. . |
| 0405561 | 1/1991 | European Pat. Off. . |
| 2284201 | 4/1976 | France . |
| 2206457 | 1/1989 | United Kingdom . |

*Primary Examiner*—Caleb Weston

*Attorney, Agent, or Firm*—Marshall, O'Toole, Gerstein, Murray & Borun

[57] ABSTRACT

A method for connecting the screen of at least one screened electrical cable to an electrical link wire includes stripping insulation from the cable and the link wire, coating at least one of the stripped parts of the cable and of the link wire to be connected with an electrically conductive adhesive, after which the parts to be connected are placed facing each other. A tape of heat-shrinkable insulating material is then wound around the parts, and heat-shrunk to form the desired connection.

8 Claims, 2 Drawing Sheets

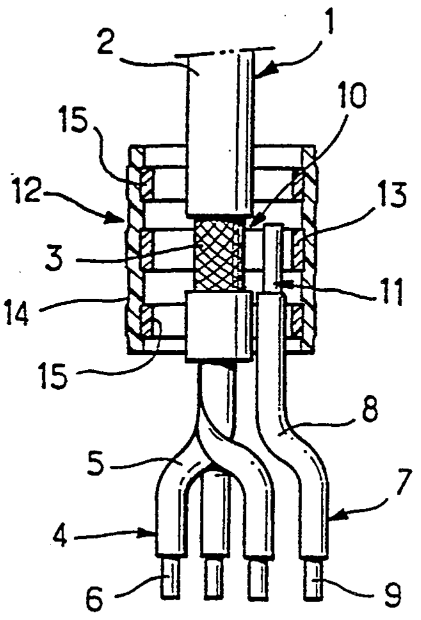
FIG. 1
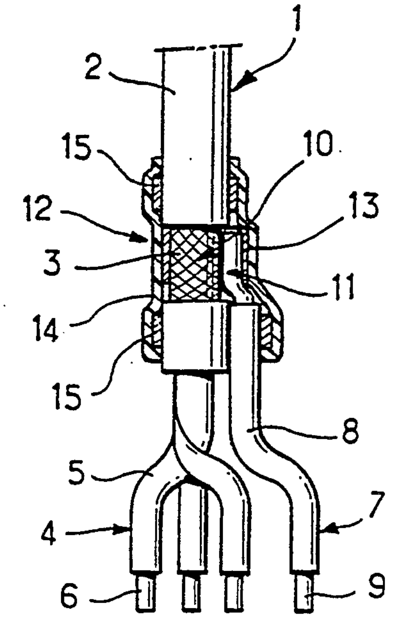
FIG. 2
FIG. 3
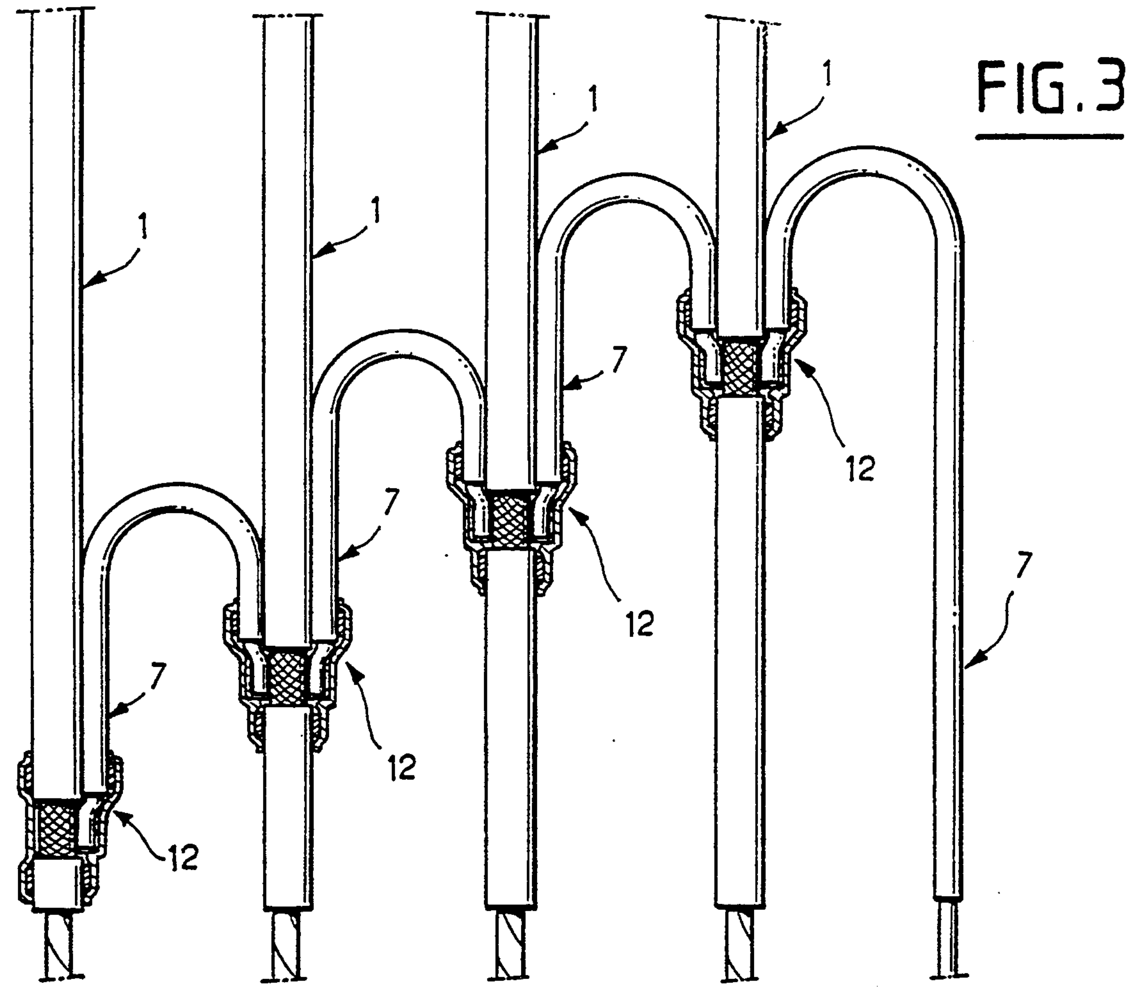

METHOD FOR CONNECTING THE SCREEN OF AT LEAST ONE SCREENED ELECTRICAL CABLE TO AN ELECTRICAL LINK WIRE, AND CONNECTION OBTAINED BY IMPLEMENTATION OF THIS METHOD

The present invention relates to a method for connecting the screen of at least one electrical screened cable to an electrical link wire, as well as the connection obtained by implementation of this method.

For the transmission of data and of control signals, especially in aircraft such as helicopters, it is necessary to form bundles of electrical wires, still called "harnesses". In such harnesses, approximately 25% of the electrical wires used are screened cables, which may include one, two or three wires. The screen of these cables is necessary in order to limit interference, either by radiation of the signals which they carry, thereby risking perturbation of the environment, or on account of their sensitivity to the radiation coming from the environment. Moreover, in 99% of cases, the screen of these cables has to be connected to the overall ground of the aircraft. However, up until now, the ground connection of these screened cables had to be carried out manually, which is a major obstacle to the complete automation of the manufacture of the harnesses.

More precisely, in the current method for connecting the screen of an electrical screened cable to an electrical link wire, said electrical screened cable including, from the outside inward, an insulating protective jacket, a screen and at least one electrical wire, and said electrical link wire including an insulating protective jacket and a conductor, the following operations are performed:

that part of the cable to be connected is stripped of its insulating protective jacket, leaving the screen bare there, that corresponding part of the link wire to be connected is stripped of its insulating jacket, leaving the conductor bare there, those said respective parts of the cable and of the link wire to be connected are placed facing each other and said parts to be connected are connected with the aid of a sleeve which includes a solder ring under a heat-shrinkable jacket.

However, the installation of this sleeve requires complicated movements, which are possible manually but not automatically, or only with very great difficulty:

passing the cable inside the sleeve, positioning and keeping the sleeve level with the stripped part of the cable, installing the link wire, simultaneously soldering and heat shrinking, for example with the aid of an infrared-radiation gun.

Moreover, it is clear that it is necessary to use different sleeves for cables of different diameters.

Furthermore, it is difficult to control the parameters manually which govern the time of exposure to the infrared, which, for correct soldering depends, inter alia, on the diameter of the cable, on the type of screen and the type of sleeve. The consequence of this is that:

if the exposure time is too long the insulation of the cable is destroyed, if it is too short, the wire is incorrectly soldered to the screen.

In addition, on account of the sleeves, connecting a plurality of screened cables to the ground currently requires forming bridging connections, with the aid of intermediate link wires, between the successive cables, an arrangement called "daisy-chaining" (described in more detail herein below), which also prevents the complete automation of the manufacture of the harnesses.

The object of the present invention is to avoid these drawbacks, and it relates to an improved method for connecting the screen of at least one screened electrical cable to an electrical link wire, which method can be implemented in a completely automated fashion.

For this purpose, the method for connecting the screen of at least one screened electrical cable to an electrical link wire, said screened electrical cable including, from the outside inward, an insulating protective jacket, a screen and at least one electrical wire, and said electrical link wire including an insulating protective jacket and a conductor, in which method:

that part of the cable to be connected is stripped of its insulating protective jacket, leaving the screen bare there, that corresponding part of the link wire to be connected is stripped of its insulating protective jacket, leaving the link wire bare there, those said respective parts of the cable and of the link wire to be connected are placed facing each other, and said parts to be connected are connected by heat-shrinking a sheath of heat-shrinkable insulating material surrounding said parts, is noteworthy, according to the invention, in that:

before those said respective parts of the cable and of the link wire to be connected are placed facing each other, at least one of said parts to be connected is coated with an electrically conducting adhesive and after those said respective parts of the cable and of the link wire to be connected have been placed facing each other, in order to form said connection sheath, a tape of heat-shrinkable insulating material is wound around said parts to be connected.

Thus, the simplicity of the operations involved in the method in accordance with the invention, and in particular, the replacement of the sleeve, used until now, by a layer of electrically conductive adhesive and a tape of heat-shrinkable insulating material, permit the automation of this method, thereby making it possible to integrate it, without problem, into the automated harness manufacture especially.

Moreover, in the case in which a plurality of screened cables have to be electrically connected to a link wire, the method according to the invention is noteworthy in that each of the stripped parts of said cables to be connected is placed facing that corresponding stripped part of said link wire to be connected, each of those said parts of said cables to be connected and/or that corresponding part of said link wire to be connected are coated with said electrically conductive adhesive and said tape of heat-shrinkable insulating material is wound around the assembly of those parts of said cables to be connected and of that corresponding part of said link wire to be connected.

In addition, it therefore appears that, in order to connect electrically a plurality of screened cables to a link wire, it is no longer necessary to have recourse to the aforementioned "daisy-chaining" arrangement, which enables, again in this case, the automation of the method in accordance with the invention.

Advantageously, at least one additional screened cable may be electrically connected to said link wire by the agency of the electrically conductive adhesive layer already connecting at least one screened cable to said link wire.

Preferably, as that part of said link wire to be connected, one end of the latter is stripped.

In addition, it is advantageous to coat the stripped part of the screen of each screened cable with said electrically conductive adhesive.

Moreover, as the adhesive, it is possible to use an adhesive loaded with a metal, said adhesive being able, in particular, to be a thixotropic silver-loaded epoxy paste.

The figures of the attached drawing will make it well understood how the invention can be performed. In these figures, identical references designate similar elements.

FIG. 1 illustrates, in partial cross section, a preparatory phase of a known method for connecting the screen of a screened electrical cable to an electrical link wire.

FIG. 2 is a view similar to FIG. 1, showing the known connection, once it has been completed.

FIG. 3 illustrates the known method for connecting the screens of a plurality of screened electrical cables to an electrical link wire.

FIGS. 1 and 2 illustrate the known method for connecting the screen of a screened electrical cable to an electrical link wire.

Figure 4:
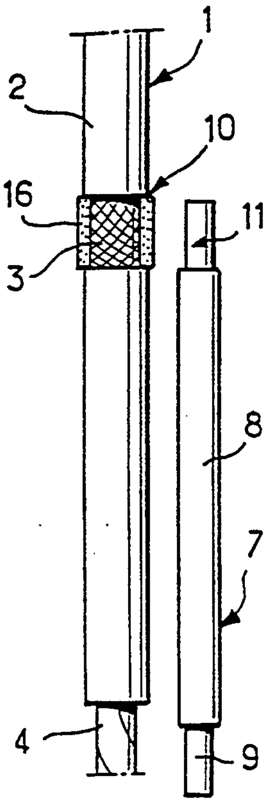
FIG. 4 shows a preparatory phase of the method in accordance with the present invention for connecting the screen of a screened electrical cable to a link wire.

The screened electrical cable 1 represented includes, from the outside inward, an insulating protective jacket 2, a screen 3 and, in this example, three electrical wires 4, each having an insulating protective jacket 5 and a conductor 6. The screen 3 of the screened cable 1 is to be connected to the ground (or possibly to a connector, which is not shown) by the agency of an electrical link wire 7 which likewise includes an insulating protective jacket 8 and a conductor 9.

In order to perform such a connection, in the usual manner, the procedure is as follows:

that part 10 of the cable 1 to be connected is stripped of its insulating protective jacket 2, leaving the screen 3 bare there, that corresponding part of the link wire 7 to be connected (for example the end 11 of the latter) is stripped of its insulating protective jacket 8, leaving the conductor 9 bare there, those said respective parts 10, 11 of the cable 1 and of the link wire 7 to be connected are placed facing each other and, onto these parts, a sleeve 12, which includes a solder ring 13 (for example a tin-lead solder ring) encased by a heat-shrinkable jacket 14 fitted, at its two ends, with sealing rings 15 (FIG. 1), is installed and at the same time as the soldering is carried out (for example with the aid of an infrared-radiation gun as mentioned already), the heat-shrinkable jacket 14 shrinks, which ensures the connection of the screen 3 of the screened cable 1 (in its stripped part 10) and of the stripped end 11 of the link wire 7 (FIG. 2).

As already mentioned, all these operations are carried out manually by an operator, and it is impossible to automate this known method because of the use of the sleeve 12, for the reasons already mentioned.

Moreover, as may be seen in FIG. 3, the connection of a plurality of screened cables 1 to the ground (or possibly to a connector) by using the sleeves is only possible by an arrangement such as shown, or "daisy-chaining", which also excludes any possibility of automation.

Figure 5:
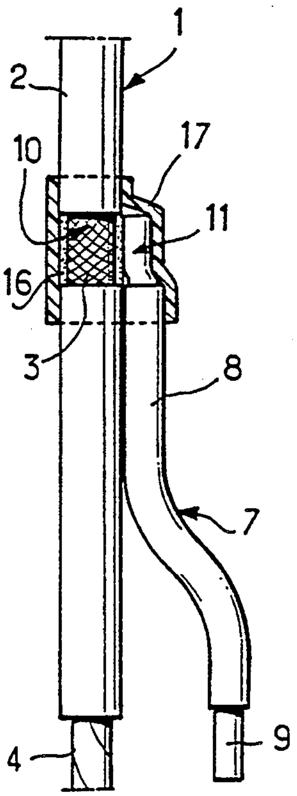
FIG. 5 shows the connection in accordance with the invention, once it has been completed.

FIGS. 4 and 5 illustrate the method in accordance with the invention.

As previously:

that part 10 of the cable 1 to be connected is stripped of its insulating protective jacket 2, leaving the screen 3 bare there, that corresponding part of the link wire 7 to be connected (like the end 11 of the latter) is stripped of its insulating protective jacket 8, leaving the conductor 9 bare there and those said respective parts 10, 11 of the cable 1 and of the link wire 7 to be connected are placed facing each other.

However, in accordance with the method according to the invention, before those said respective parts 10, 11 of the cable 1 and of the link wire 7 to be connected have been placed facing each other, at least one of the parts 10, 11 to be connected, in this case the stripped part 10 of the screen 3 of the cable 1 (FIG. 4), is coated with a layer 16 of an electrically conductive adhesive.

Next, after those said respective parts 10, 11 of the cable 1 and of the link wire 7 to be connected have been placed facing each other, a tape 17 of heat-shrinkable insulating material is wound around the parts 10, 11 to be connected (FIG. 5) and said tape is heat-shrunk, for example with the aid of an infrared-radiation gun.

All these simple operations can easily be automated, by using any suitable machine or machines, especially one integrated into the process for manufacturing electrical cable bundles.

Figure 6:
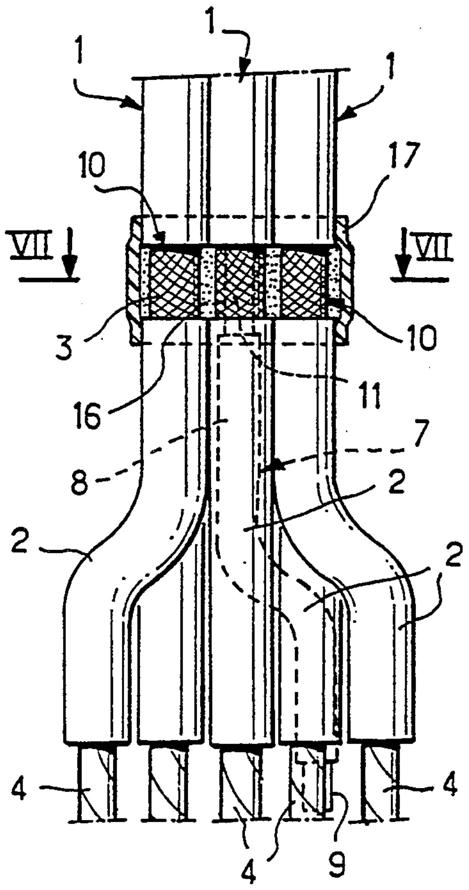
FIG. 6 illustrates the implementation of the method in accordance with the invention for a plurality of screened electrical cables, with wrenching in the region of the connection.
Figure 7:
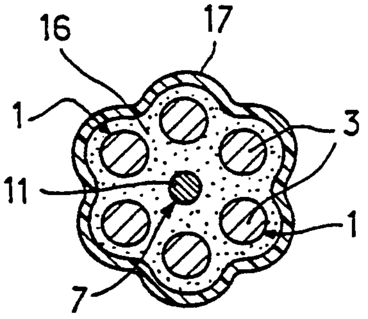
FIG. 7 is a cross section along the line VII—VII of FIG. 6.
Figure 8:
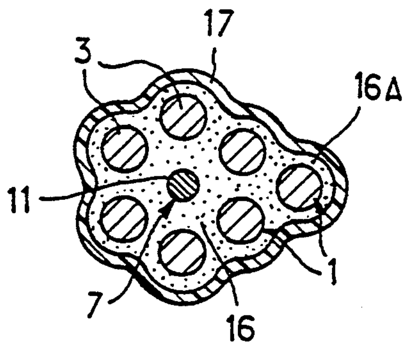
FIG. 8 is a view similar to FIG. 7 illustrating an extension of the method in accordance with the invention.

This is also the case when a plurality of screened cables are to be electrically connected to a link wire (FIGS. 6–8).

In this case, each of those stripped parts 10 of said cables 1 to be connected is placed facing that corresponding stripped end 11 of the link wire 7 to be connected. The number of cables 1 which can be connected to a single link wire 7 depends, of course, on the diameter of the cables (and therefore on their bulk). As shown in FIG. 7, this may be six for example, the cables 1 being equiangularly distributed around the link wire 7. Next, each of those said parts 10 of the cables 1 to be connected and/or that corresponding end 11 of the link wire 7 to be connected are coated with a layer 16 of electrically conductive adhesive (this may be especially each part 10 of the cables 1 to be connected) and a tape 17 of heat-shrinkable insulating material is wound around the assembly of those parts 10 of the cables 1 to be connected and of that end 11 of the link wire 7 to be connected, which tape is then heat-shrunk as before, for example with the aid of an infrared-radiation gun.

All these operations can also be completely automated and, in this case, the use of the prior "daisy-chaining" arrangement, with the drawbacks associated with it, is avoided.

It will be noted, moreover, that at least one additional screened cable 1 may be electrically connected 10 to the link wire 7, as FIG. 8 illustrates, by the agency of protuberances 16A of the layer 16 of electrically conductive adhesive connecting the other screened cables 1 to the link wire 7.

The adhesive used may especially be a thixotropic silver-loaded epoxy paste, such as that supplied by the EPOTECNY Company under the commercial name EPO-TEK 417, the technical characteristics of which are as follows:

electrical resistivity: 0.05 to 0.07 milliohm/cm polymerization cycles:

½ hour at 150° C.

1 hour at 100° C.

2 hours at 80° C.

2 to 3 days at ambient temperature degradation temperature after polymerization: 350° C.

I claim:

1. A method for connecting a screen of a screened electrical cable to an electrical link wire, said screened electrical cable (1) including, from the outside in, an insulating protective jacket (2), a screen (3), and at least one electrical wire (4), said electrical link wire (7) including an insulating protective jacket (8) and a conductor (9), said method comprising the steps of:

stripping a part (10) of the cable (1) of its insulating protective jacket (2), leaving the screen (3) bare, stripping a corresponding part (11) of the link wire (7) of its insulating protective jacket (8), leaving the link wire (9) bare, coating at least one of the respective bare parts (10, 11) of the cable (1) and of the link wire (7) with an electrically conductive adhesive (16);

placing said parts (10, 11) facing each other, winding a tape of heat-shrinkable insulating material around said parts (10, 11); and heat-shrinking said tape in place.

2. The method as claimed in claim 1, wherein a plurality of screened cables (10 are electrically connected to a link wire (7), each of the stripped parts (10) of said cables (1) being placed facing the corresponding stripped part (11) of said link wire (7), each of said stripped parts (10) of said cables (1) and/or the corresponding stripped part (11) of said link wire (7) being coated with said electrically conductive adhesive (16), and said tape (17) of heat-shrinkable insulating material being wound around an assembly of said stripped parts (10) of said cables (1) and said stripped part (11) of said link wire (7).

3. The method as claimed in claim 2, wherein at least one additional screened cable (1) is electrically connected to said link wire (7) by connecting said additional cable to the layer (16A) of electrically conductive adhesive already connecting at least one screened cable (1) to said link wire (7).

4. The method as claimed in claim 1, wherein said part (11) of said link wire (7) to be connected consists of the stripped end (11) thereof.

5. The method as claimed in claim 1, wherein the stripped part (10) of the screen (3) of each screened cable (1) is coated with said electrically conductive adhesive (16).

6. The method as claimed in claim 1, wherein, as the adhesive (16), an adhesive loaded with a metal is used.

7. The method as claimed in claim 6, wherein said adhesive is a thixotropic silver-loaded epoxy paste.

8. An electrical connection between a screen (3) of at least one electrically screened cable (1) and an electrical link wire (7), made in accordance with the method of claim 1.

* * * * *

UNITED STATES PATENT AND TRADEMARK OFFICE

CERTIFICATE OF CORRECTION

PATENT NO. : 5,347,090

DATED : September 13, 1994

INVENTOR(S) : LEON G. CERDA

It is certified that error appears in the above-identified patent and that said Letters Patent is hereby corrected as shown below:

Column 5, line 8, omit "10".

Column 6, line 9, "(10" should be --(1)--

Signed and Sealed this

Eighth Day of November, 1994

Attest:

BRUCE LEHMAN

*Attesting Officer* *Commissioner of Patents and Trademarks*